Feb. 11, 1958  J. KOZA  2,823,352
ADJUSTABLE GALVANOMETER SUSPENSION
Filed Dec. 30, 1954

Inventor:
John Koza
by, R. Gerald Foye
His Attorney

# United States Patent Office 2,823,352
Patented Feb. 11, 1958

2,823,352

ADJUSTABLE GALVANOMETER SUSPENSION

John Koza, Lynnfield Center, Mass., assignor to General Electric Company, a corporation of New York Application December 30, 1954, Serial No. 478,620

3 Claims. (Cl. 324—154)

My invention relates to galvanometers and has particular application to suspension arrangements for galvanometers intended for use in oscillograph applications.

It has been discovered that the degree of parallelism between the suspended mirror and the lens of an oscillograph galvanometer affects the quality of the light spot which is reflected from the mirror through the lens onto the film. The damping liquid with which the galvanometer is filled disperses the various colors present in the light beam, resulting in a wide, colored spot.

It has been necessary in the past, in order to control this effect, to maintain very close tolerances in the manufacture of the various elements making up the suspension. Particularly it has been necessary to control the tolerances on the elements which formed the supports for the wire on which the galvanometer mirror was suspended since a slight variation in the dimensions of these elements resulted in a shifting of the plane formed by the supporting wire which in turn, of course, caused a shift in the angular position of the mirror relative to the lens.

In view of the foregoing, it is one object of my invention to provide an improved galvanometer suspension in which the degree of parallelism between the galvanometer mirror and the lens may be adjusted.

It is a further object of my invention to provide an improved adjustable suspension for galvanometers of the bifilar type.

Briefly stated, in accordance with one aspect of my invention, I provide a pair of guide spindles having grooves therein for positioning and supporting the suspension wire which supports the galvanometer mirror. The grooves on one of these spindles are deliberately machined eccentric to each other so that rotation of the spindle causes the plane of the mirror to shift angularly relative to the lens, thus providing an adjustment of parallelism between the mirror and the lens. It will be realized that an even finer adjustment may be obtained if both spindles were to be provided with eccentrically machined grooves although the degree of adjustability obtainable with rotation of only one eccentrically machined spindle has been found to be sufficient in at least one application wherein my invention was employed.

Other objects and advantages of my invention will be apparent from the following description taken in connection with the accompanying drawing, and its scope will be pointed out in the appended claims.

Figure 1:
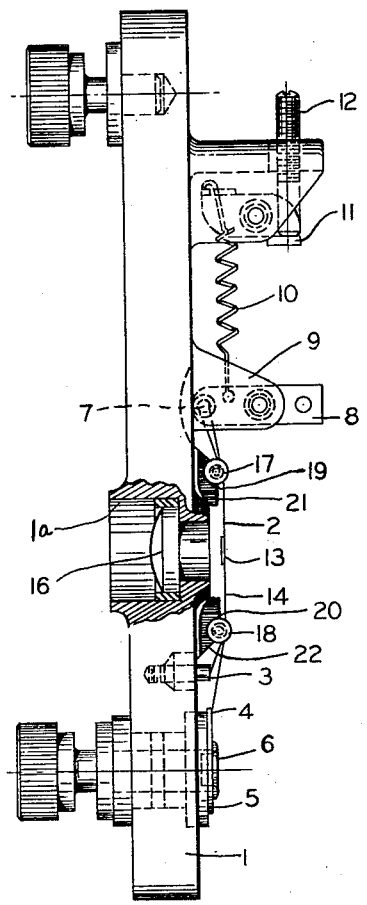
Figure 2:
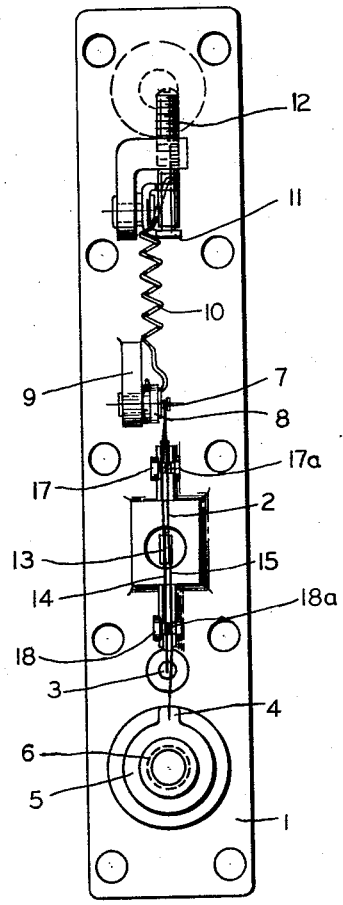
Figure 3:
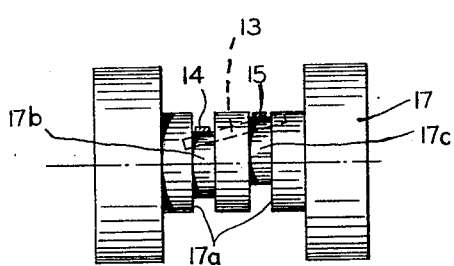

In the drawing, Fig. 1 is a side view of the internal mechanism of an oscillograph galvanometer embodying my invention; Fig. 2 is a front view of the galvanometer mechanism of Fig. 1; while Fig. 3 is an enlarged view of one of the supporting spindles showing the eccentrically machined grooves and the relationship thereto of the mirror and the supporting wires.

Referring now to Figs. 1 and 2, there is shown a bifilar galvanometer suspension supported on a mounting plate 1 and including a looped wire 2 electrically grounded and mechanically connected at one end to a post 3, and mechanically and electrically connected at the other end to a tab 4 on a washer 5 which is, in turn, connected to a terminal stud 6 as shown. At the end of the loop, the wire is passed over a spindle 7 which is formed of an insulating material and which is supported on a lever 8.

The lever 8 is pivotally mounted on a bracket 9 extending out from the supporting plate 1 so that the wire 2 may be kept taut by means of a spring 10 which is secured to the lever 8. The spring 10 is fastened at its other end to a pivotally supported lever 11 which is adjustable through the agency of a screw 12 to vary the tension in the spring 10 and thereby adjust the tautness of the wire 2.

A mirror 13 is supported on a pair of substantially parallel portions 14 and 15 of the wire 2 adjacent a lens 16 which is supported in the mounting plate 1 in an aperture 1a as shown in the cutaway portion of Fig. 1. The wire portions 14 and 15 are positioned relative to each other by means of insulating guide members 17 and 18 which may be in the form of spindles as shown. The spindles 17 and 18 are provided with spaced apart grooves 17a and 18a respectively which engage the wire sections 14 and 15 and serve to position these sections relative to the lens 16. The spindles 17 and 18 are supported in slots 19 and 20 formed respectively in a pair of mounting brackets 21 and 22 and may be cemented or otherwise suitably affixed in place once the suspension has been adjusted as hereinafter described. The mirror 13 is attached to the wire portions 14 and 15 by cementing or in any other suitable manner.

Deflection of the mirror 13 is caused by an electric current flowing through the wire loop 2 acting to set up a magnetic field which interacts with the magnetic field produced by a permanent magnet or other magnetic means, not shown, which are positioned adjacent the loop 2 upon assembly of the suspension into a suitable casing or enclosure. For purposes of flat frequency response, the suspension is generally immersed in a damping liquid, such as oil, of carefully controlled viscosity so that the space between the mirror 13 and the lens 16 is filled with the damping fluid.

As has been pointed out above, it has been discovered that when the mirror 13 is at an angle with respect to the lens 16, the damping fluid in the light beam tends to disperse the various colors present in the beam, which dispersion results in a wide, colored spot. A wide light spot is, of course, undesirable for most oscillograph applications since it results in a wide film trace which is in many cases extremely difficult to interpret with the desired degree of accuracy.

It has therefore been necessary in the manufacture of galvanometers of this type to carefully control the parallelism between the mirror and the lens by maintaining very close tolerances in the manufacture of the elements which form the suspension.

My invention, as illustrated herein in one embodiment thereof, provides means whereby the degree of parallelism between the mirror and the lens may be adjusted after the suspension has been manufactured and assembled, thus greatly relaxing the stringent tolerance requirements heretofore necessary to maintain this parallelism.

Referring now to Fig. 3 the spindle 17 is shown in an enlarged view thereof together with the wire portions 14 and 15 and the mirror 13 as they would appear from a top view. The grooves 17a in the spindle are substantially annular in shape and their depths are defined by cylindrical surfaces 17b and 17c which are formed so as to be eccentric to one another so that at least one of the grooves is of varying depth around the periphery of the spindle.

It will be seen that rotative movement of the spindle causes the wire portion 15 to move pivotally about the wire portion 14 and thereby cause angular movement of the mirror 13 relative to the lens 6. Thus the degree of parallelism between the mirror 13 and the lens 6 may be adjusted after assembly of the suspension prior to cementing or otherwise affixing the spindle 17 in place. It will be realized that the drawings are purposely enlarged to permit a full disclosure of details and that the spindle 17 would in most constructions be quite small so that rather delicate instruments would be required to make the necessary adjustment. It has been found that frictional contact between such instruments and the exposed surface of the spindle has permitted an adequate force to be transmitted to the spindle to allow rotative adjustment by such means. It is, of course, realized that special notches or the like may be provided on the adjustable guide member if so desired in order to facilitate adjustment, although, as just pointed out, means of this type were found unnecessary in at least one application wherein my invention has been employed.

Further, the other grooved spindle 18 may be formed in the same manner as the spindle 17, in which case both the spindles 17 and 18 would be adjustable to change the angular position of the mirror. Such an arrangement provides a greater range of adjustments although it has been found that in most applications, the provision of only a single adjustable member yields an adequate range of adjustments to compensate for normal manufacturing tolerances.

It can be seen that the spindles 17 and 18 may take other forms, such as grooved blocks or the like with either one or both being movable either rotatively or in some other manner to change the relative positions of the surfaces which position the mirror supporting wires to permit angular adjustment of the mirror relative to the lens. Further it will be appreciated that my invention may be applied to galvanometer suspensions other than the type shown although for the reasons hereinbefore mentioned it will be found particularly advantageous in galvanometers intended for use in oscillographs and other devices wherein similar problems exist.

What I claim as new and desire to secure by Letters Patent of the United States is:

1. A galvanometer comprising a mirror for reflecting a beam of light, a lens for focusing the reflected light beam, and an adjustable suspension for deflectably supporting said mirror adjacent said lens, said suspension comprising a pair of spaced apart wire portions secured to said mirror in supporting relationship thereto so as to determine the plane in which said mirror is nominally positioned, and a spindle engaging and positioning at least one of said wires on a cylindrical surface thereof which is eccentric to the axis of said spindle, said spindle being rotatable about its own axis to cause substantially lateral movement of at least one of said wires relative to the other so as to adjust said mirror angularly with respect to said lens.

2. An adjustable galvanometer suspension comprising a mirror deflectably supported on a pair of spaced apart wires adjacent a lens, and a guide member having a pair of spaced apart grooves therein for positioning said wires, said grooves extending lengthwise of one another in said guide member and being of varying depths relative to each other along their respective lengths and said guide member being adjustable relatively to said wires and lengthwise of said grooves to bring different portions of said grooves into engagement with said wires and thereby adjust said mirror angularly with respect to said lens.

3. In a bifilar galvanometer having a mirror deflectably suspended adjacent a lens on a pair of spaced apart substantially parallel portions of an elongated wire loop, means for angularly adjusting said mirror relative to said lens comprising a guide spindle having a pair of spaced apart grooves therein engageable with said spaced apart wire portions to form supporting and guide means therefor, said grooves being formed eccentrically with respect to each other such that rotation of said spindle causes movement of said wire portions relative to each other in a direction substantially perpendicular to the plane defined by said wire portions, whereby said spindle may be rotated to angularly adjust the position of said mirror with respect to said lens.

References Cited in the file of this patent
UNITED STATES PATENTS

| | | |
|---|---|---|
| 1,728,555 | Legg | Sept. 17, 1929 |
| 1,873,696 | Centeno | Aug. 23, 1932 |
| 2,539,158 | Parsegian | Jan. 23, 1951 |
| 2,563,167 | Hathaway | Aug. 7, 1951 |